(12) United States Patent
Katamoto et al.

(10) Patent No.: US 12,022,038 B2
(45) Date of Patent: Jun. 25, 2024

(54) IMAGE DISPLAY DEVICE

(71) Applicant: SHARP KABUSHIKI KAISHA, Sakai (JP)

(72) Inventors: Kohji Katamoto, Sakai (JP); Takashi Yamanaka, Sakai (JP); Megumi Ido, Sakai (JP); Yuriko Terada, Sakai (JP); Masao Saeda, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/126,737

(22) Filed: Mar. 27, 2023

(65) Prior Publication Data

US 2023/0319200 A1  Oct. 5, 2023

(30) Foreign Application Priority Data

Mar. 30, 2022 (JP) ................................. 2022-054748

(51) Int. Cl.
*G06F 3/048* (2013.01)
*H04N 1/00* (2006.01)

(52) U.S. Cl.
CPC ..... *H04N 1/00503* (2013.01); *H04N 1/00474* (2013.01); *H04N 1/00482* (2013.01); *H04N 2201/0094* (2013.01)

(58) Field of Classification Search
CPC ........... H04N 1/00503; H04N 1/00474; H04N 1/00482; H04N 2201/0094
See application file for complete search history.

(56) References Cited

U.S. PATENT DOCUMENTS

| 7,389,256 | B1* | 6/2008 | Adams | G06Q 40/02 |
| | | | | 705/40 |
| 2006/0012823 | A1* | 1/2006 | Fukuda | H04N 1/32101 |
| | | | | 358/1.15 |
| 2007/0136208 | A1* | 6/2007 | Hamashima | B41J 11/003 |
| | | | | 705/62 |
| 2008/0231888 | A1* | 9/2008 | Kuwano | H04N 1/32523 |
| | | | | 358/1.15 |
| 2010/0265547 | A1* | 10/2010 | Katou | G06F 3/1204 |
| | | | | 358/1.16 |
| 2011/0242596 | A1* | 10/2011 | Katsuki | G06F 3/1288 |
| | | | | 358/1.15 |
| 2012/0243016 | A1* | 9/2012 | Amano | H04N 1/00474 |
| | | | | 358/1.13 |

(Continued)

FOREIGN PATENT DOCUMENTS

| CN | 101500058 A | * | 8/2009 | ........... H04N 1/0035 |
| JP | H0575752 A | | 3/1993 | |
| JP | 2021172073 A | * | 11/2021 | ........... G06F 3/1204 |

*Primary Examiner* — Rashawn N Tillery
(74) *Attorney, Agent, or Firm* — ScienBiziP, P.C.

(57) ABSTRACT

An image display device includes a display that displays an executable function, an acceptor that accepts an input of a function to be executed and a setting selectable for the function, a storage that stores history information, the history information being a series of processing details associating the function to be executed based on the input with a setting used when the function is executed, and a controller that causes the display to display a batch button summarizing the series of processing details when the series of processing details satisfies a predetermined execution condition.

7 Claims, 9 Drawing Sheets

(56) References Cited

U.S. PATENT DOCUMENTS

| | | | |
|---|---|---|---|
| 2014/0082137 A1* | 3/2014 | Matoba | H04L 67/02 |
| | | | 709/217 |
| 2014/0139859 A1* | 5/2014 | Saito | G06F 3/1224 |
| | | | 358/1.13 |
| 2017/0006173 A1* | 1/2017 | Ueda | H04N 1/00413 |
| 2018/0217797 A1* | 8/2018 | Inoue | H04N 1/32122 |
| 2018/0220015 A1* | 8/2018 | Akuzawa | H04N 1/00482 |
| 2019/0245989 A1* | 8/2019 | Yoshida | G06F 3/1205 |
| 2019/0306349 A1* | 10/2019 | Shino | H04N 1/00514 |
| 2020/0296238 A1* | 9/2020 | Nishiyama | H04N 1/00503 |
| 2021/0303144 A1* | 9/2021 | Takahashi | G06F 3/04817 |
| 2021/0329136 A1* | 10/2021 | Hirobe | G06F 3/0482 |
| 2021/0385355 A1* | 12/2021 | Hosoda | H04N 1/00413 |
| 2022/0191335 A1* | 6/2022 | Itai | H04N 1/0097 |

* cited by examiner

IMAGE DISPLAY DEVICE

CROSS-REFERENCE TO RELATED APPLICATION

The present application claims priority from Japanese Application JP2022-054748, the content to which is hereby incorporated by reference into this application.

BACKGROUND OF THE INVENTION

1. Field of the Invention

The present disclosure relates to an image display device.

2. Description of the Related Art

Conventional technologies are known to improve the user operability of devices having operation panels. For example, there are devices that improve operability of an operation panel with hierarchical menus by counting the number of times each menu is used and rearranging the menus from deepest to shallowest positions in the hierarchy in order of frequency of use.

SUMMARY OF THE INVENTION

However, since conventional devices only change the positions of the menus on the hierarchy in accordance with the frequency of use, users must operate the operation panel and select the desired menu to use a predetermined menu.

The disclosure is made in view of the above-mentioned problems. An object of the disclosure is to provide an image display device that can further improve user convenience.

An image display device according to an aspect of the disclosure includes: a display that displays an executable function; an acceptor that accepts an input of a function to be executed and a setting selectable for the function; a storage that stores history information, the history information being a series of processing details associating the function to be executed based on the input with a setting used when the function is executed; and a controller that causes the display to display a batch button summarizing the series of processing details when the series of processing details satisfies a predetermined execution condition.

DETAILED DESCRIPTION OF THE INVENTION

Figure 1:
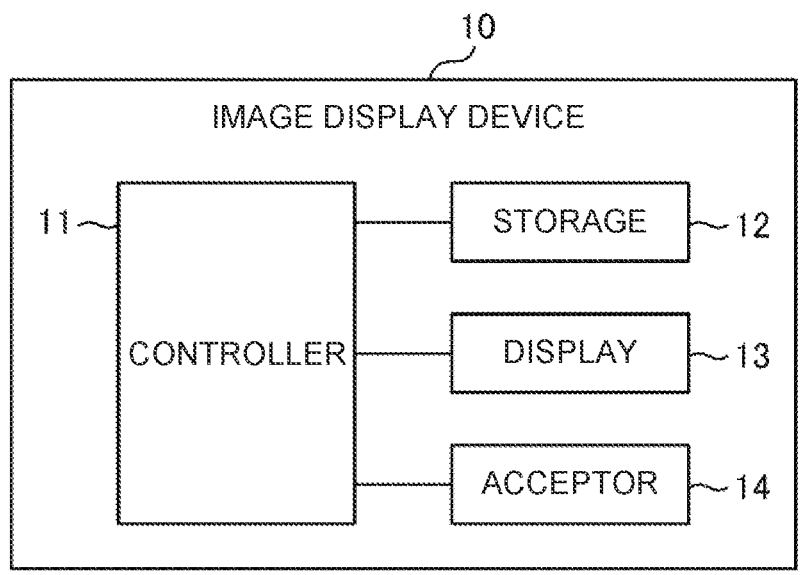
FIG. 1 is a functional block diagram illustrating an example of a schematic configuration of an image display device according to an embodiment.

Embodiments of the disclosure is described below with reference to the drawings. In the drawings, the same or equivalent components are denoted by the same symbols, and descriptions of the same or equivalent components are omitted without repeating them.

FIG. 1 is a functional block diagram illustrating an example of a schematic configuration of an image display device 10 according to an embodiment. The image display device 10 displays images on a display 13. In this specification, the image display device 10 described below is exemplified as a multifunction peripheral capable of executing functions such as copying, facsimile (faxing), scanning, and printing. If the image display device 10 is a multifunction peripheral, the display 13 displays the functions that the multifunction peripheral can execute. The image display device 10 may also display on the display 13 the settings that can be selected by a user as appropriate for each function. Details of the settings are described later.

In the present embodiment, the image display device 10 can accept operation input by a user at an acceptor 14. When a user makes an operation input to the acceptor 14 to execute a predetermined function, the image display device 10 executes the predetermined function in response to the operation input. A predetermined function is a function that can be executed by the image display device 10 and may include, for example, copying, faxing, scanning, and printing. The acceptor 14 may also accept setting inputs for each function. When a setting input is accepted, the image display device 10 executes the entered function with the setting entered in the acceptor 14.

As illustrated in FIG. 1, the image display device 10 includes as functional parts a controller 11, a storage 12, the display 13, and the acceptor 14.

The controller 11 comprehensively controls and manages the image display device 10, including each functional part of the image display device 10. The controller 11 executes various controls, for example, by operating control programs stored in the storage 12. For example, the controller 11 can be composed of a control device such as a central processing unit (CPU) or micro processing unit (MPU).

The controller 11 executes various functions on the basis of a user's operation input received at the acceptor 14. For example, the controller 11 executes functions such as copying, faxing, scanning, and printing on the basis of the user's operation input received at the acceptor 14. When a setting input is accepted at the acceptor 14, the controller 11 executes the entered function with the entered setting.

In the present embodiment, the controller 11 stores a series of processing details executed by the image display device 10 in the storage 12 as history information. The series of processing details is information that associates a function to be executed on the basis of an input to the acceptor 14 and the settings at the time the function is executed. That is, the series of processing details consists of a functions and settings selected when the function is to be executed.

The controller 11 may control the display content on the display 13 on the basis of the history information stored in the storage 12. Details of control of the display content by the controller 11 is described later.

The storage 12 is a storage medium capable of storing programs and data. The storage 12 can be composed of, for example, a semiconductor memory or a magnetic memory. Specifically, the storage 12 can be composed of, for example, by an electrically erasable programmable read-only memory (EEPROM). The storage 12 may store, for example, programs for operating the controller 11.

In the present embodiment, the storage 12 stores a series of processing details as history information. The storage 12 may, for example, store a series of processing details in which a predetermined setting and a predetermined function are associated with each other each time the controller 11 executes the predetermined function at the predetermined setting based on a user's operation input. In this way, the storage 12 accumulates a series of executed processing details.

The display 13 is a device that displays images. The display 13 may be composed of a well-known display such as a liquid crystal display (LCD), an organic electro-luminescence display (OELD), or an inorganic electro-luminescence display (IELD). The display 13 displays various information on the basis of the control of the controller 11. Specifically, the display 13 displays, for example, the functions that the image display device 10 can execute. The display 13 may also display information on the settings that can be selected by a user for each function.

The acceptor 14 accepts an operation input from a user. In the present embodiment, the acceptor 14 accepts an input of a function that the user causes the image display device 10 to execute. The acceptor 14 may further accept input of settings that can be selected in the function.

The acceptor 14 can be composed of, for example, a touch panel. The touch panel can be composed by a known method such as a capacitive method, a resistive film method, an infrared blocking method, or an ultrasonic surface acoustic wave method. The acceptor 14 may be positioned on the display 13 if the acceptor 14 is composed of a touch panel. For example, the touch panel or the acceptor 14 may be formed of, for example, transparent acrylic resin, and the image displayed on the display 13 may be visible through the touch panel. When a user touches the acceptor 14 composed of a touch panel for operation input, the position of the touch is detected, and processing corresponding to the detected position of the touch is executed.

Next, specific examples of processing executed by the controller 11 of the image display device 10 is described with reference to flowcharts.

In the present embodiment, the controller 11 may create a batch button on the basis of history information. Specifically, the controller 11 may create a batch button that summarizes a series of processing details stored in the storage 12 as history information when the series of processing details satisfies a predetermined execution condition. The controller 11 may display the created batch button on the display 13. The process up to the point where the controller 11 creates a batch button and displays the batch button on the display 13 is hereinafter also referred to as "batch button creation process".

Figure 2:
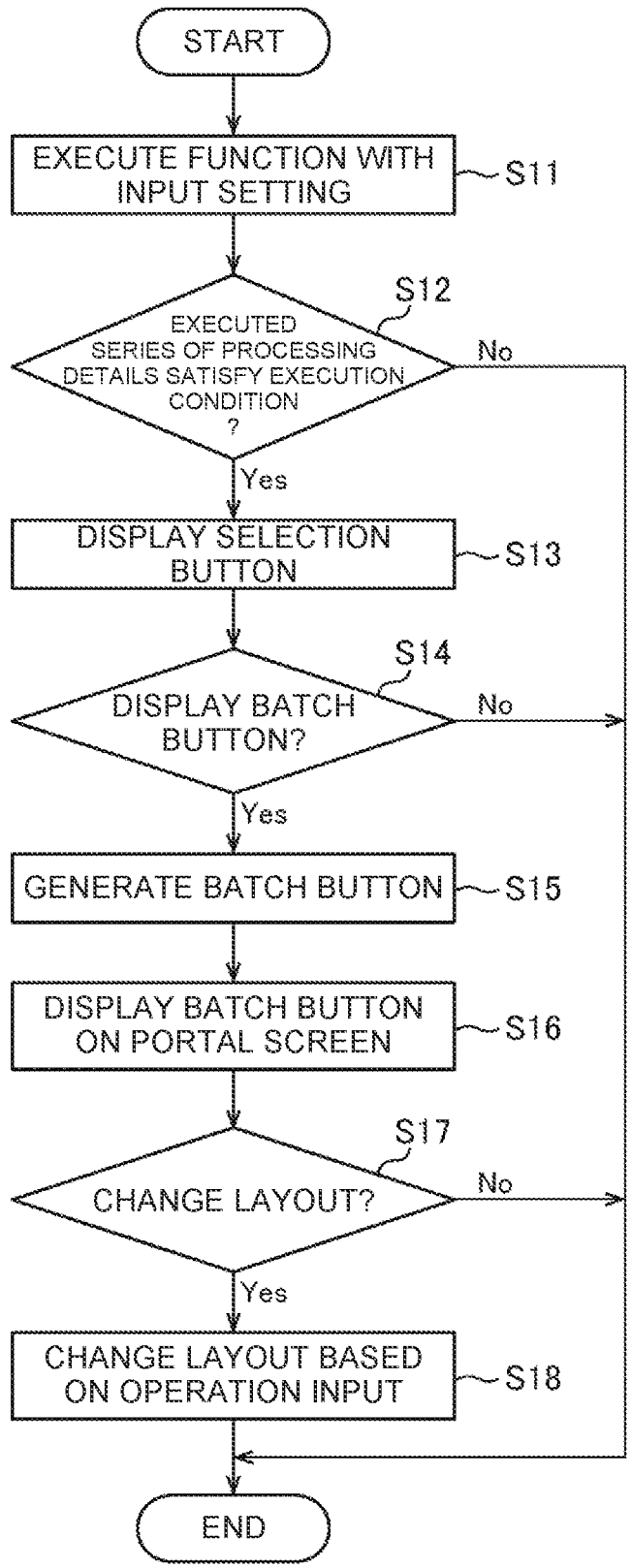
FIG. 2 is a flowchart illustrating an example of a batch button creation process executed by the controller in FIG. 1.

FIG. 2 is a flowchart illustrating an example of a batch button creation process. The flow in FIG. 2 may be initiated, for example, when a user makes an operation input to the image display device 10 to execute a predetermined function. At this time, the user inputs the function to be executed and the setting that can be selected for that function to the acceptor 14 of the image display device 10.

Here the details of the setting are described. The setting is a matter that a user can select as desired when each function is to be executed. For example, a setting selectable in the copy function may include a setting for color mode, copy paper, double-sided mode, magnification, density, post-processing, etc. The color mode setting is related to whether or not to perform color copying, and can be selected from, for example, color, black and white, or automatic as a specific setting. The copy paper setting is related to paper on which copy images are formed and can be selected from, for example, various paper sizes (B5, B4, A4, A3, etc.), card, postcard, or envelope as a specific setting. The double-sided mode setting is related to whether or not to perform double-sided copying and can be selected from, for example, single-sided or double-sided as a specific setting. In the double-sided mode, it may further be possible to select whether the document to be copied in a single-sided mode or a double-sided mode. Accordingly, these modes can be combined to select copy from one side to one side, copy from one side to both sides, copy from both sides to one side, or copy from both sides to both sides. When double-sided copying is performed in the double-sided mode, the orientation in which the double-sided copying is to be performed can be selected. The magnification setting is related to the magnification of the copy and is appropriately selected, for example, between 25% and 455%. The density setting is related to the copy density and can be selected from, for example, automatic, light, or dark. The post-processing is applied to the copy obtained after copying and can be selected from, for example, sorting, paper folding, and two-hole punch. The copy function may further allow a setting related to the number of copies. That is, the copy function may allow a setting of how many copies are to be made.

A setting may be provided for each function that the image display device 10 is capable of executing. Accordingly, items that can be set for each function other than the copy function may also be provided. For example, settings selectable in the fax function may include a destination name setting, a document setting, a density setting, and an image quality setting. The destination name setting is related to the destination of the fax and can be selected from, for example, predefined destination names. The document setting is related to the fax transmission document and can be selected from, for example, various paper sizes (B5, B4, A4, A3, etc.), card, postcard, or envelope as a specific setting. The density setting is related to the reading density of the fax transmission document and can be selected from, for example, automatic, light, or dark. The image quality setting is related to the image quality when a fax document is read and can be selected from, for example, black and white binary and black and white gradation.

The settings may be provided for each of the functions other than those specifically described above. Accordingly, items that can be set for a scan function and a print function may also be provided.

The user inputs the function to be executed and the setting that can be selected for that function to the acceptor 14 of the image display device 10. When a user makes an operation input to operate an execution button for executing an input function with an input setting, the flow in FIG. 2 can start.

When the acceptor 14 accepts an operation input by a user, the controller 11 executes the input function with the input setting (step S11). That is, in step S11, the controller 11 executes a series of processing details including predetermined settings and a predetermined function based on a user's operation input.

For example, it is assumed that a user enters "copy" as a function and selects "copy paper: A4", "copy from one side to both sides", and "five copies" as a setting. In this case, the controller 11 executes the copy function with the selected setting. That is, in this example, five copies are obtained by copy from a single-sided document to both sides of a piece of A4 paper. In this case, the series of processing details associates the function "copy" and the settings "copy paper: A4", "copy from one side to both sides", and "five copies".

When the controller 11 executes a series of processing details in step S11, the executed series of processing details may be stored in the storage 12 as history information.

After the input function is executed with the input settings, the controller 11 determines whether or not the executed series of processing details satisfies a predetermined execution condition (step S12). The controller 11 may, for example, refer to the history information stored in the storage 12 to determine whether or not the series of processing details executed satisfies the predetermined execution condition.

Here, the predetermined execution condition is a condition to determine whether or not the series of processing details executed in step S11 is frequently executed. For example, the predetermined execution condition is that the series of processing details is executed a predetermined number of times or more. The predetermined number of times may be determined as appropriate, e.g., several to several hundred times. In this case, the controller 11 may determine that the series of processing details executed in step S11 has satisfied the execution condition when the series of processing details has been executed a predetermined number of times or more. On the other hand, the controller 11 may determine that the series of processing details has not satisfied the execution condition when the series of processing details has been executed in step S11 for a number of times less than the predetermined number.

Alternatively, for example, the predetermined execution condition may be that the execution percentage of the series of processing details is greater than a predetermined value. The execution percentage of the series of processing details is the number of times the series of processing details is executed relative to the total number of times processing has been executed by the image display device 10. A predetermined value of the percentage may be determined as appropriate, e.g., between several percent and several tens of percent. In this case, the controller 11 may determine that the series of processing details executed in step S11 has satisfied the execution condition when the percentage of execution of the series of processing details is a predetermined value or more. On the other hand, the controller 11 may determine that the series of processing details has not satisfied the execution condition when the execution percentage of the series of processing details executed in step S11 is less than the predetermined value. The execution condition described here is merely an example. The execution condition may be defined as an appropriate condition that can determine whether or not a series of processing details is frequently executed.

As described above, when the "copy" function is executed with the settings of "copy paper: A4", "copy from one side to both sides", and "five copies" in step S11, the controller 11 may determine whether or not the number of times the "copy" function is executed with the settings of "copy paper: A4", "copy from one side to both sides" and "five copies" in step S12 is equal to or greater than a predetermined number of times. Alternatively, the controller 11 may determine in step S12 whether or not the percentage of the "copy" function being executed with the settings "copy paper: A4", "copy from one side to both sides" and "five copies" exceeds a predetermined value. The controller 11 may refer to the history information for the determination. That is, the controller 11 may use history information on past executions accumulated in the storage 12 to determine whether or not the series of processing details such as the example above satisfies an execution condition.

The determination in step S12 does not necessarily have to be made after the series of processing details is executed. For example, the determination in step S12 may be made before the series of processing details is executed or when an operation input to execute the series of processing details is received.

If the controller 11 determines that the series of processing details has not satisfied the predetermined execution condition (No in step S12), the flow ends. In this case, the controller 11 may execute the flow again from the beginning when another operation input is received from a user.

Meanwhile, if the controller 11 determines that the series of processing details satisfies the predetermined execution condition (Yes in step S12), a batch button summarizing the series of processing details may be displayed on the display 13. The controller 11 may display the batch button on the display 13 when an operation input to display the batch button is accepted.

For example, if the controller 11 determines that the series of processing details satisfies the predetermined execution condition (Yes in step S12), the controller 11 causes the display 13 to display a selection button to allow a user to select whether or not to display the batch button (step S13).

Figure 3:
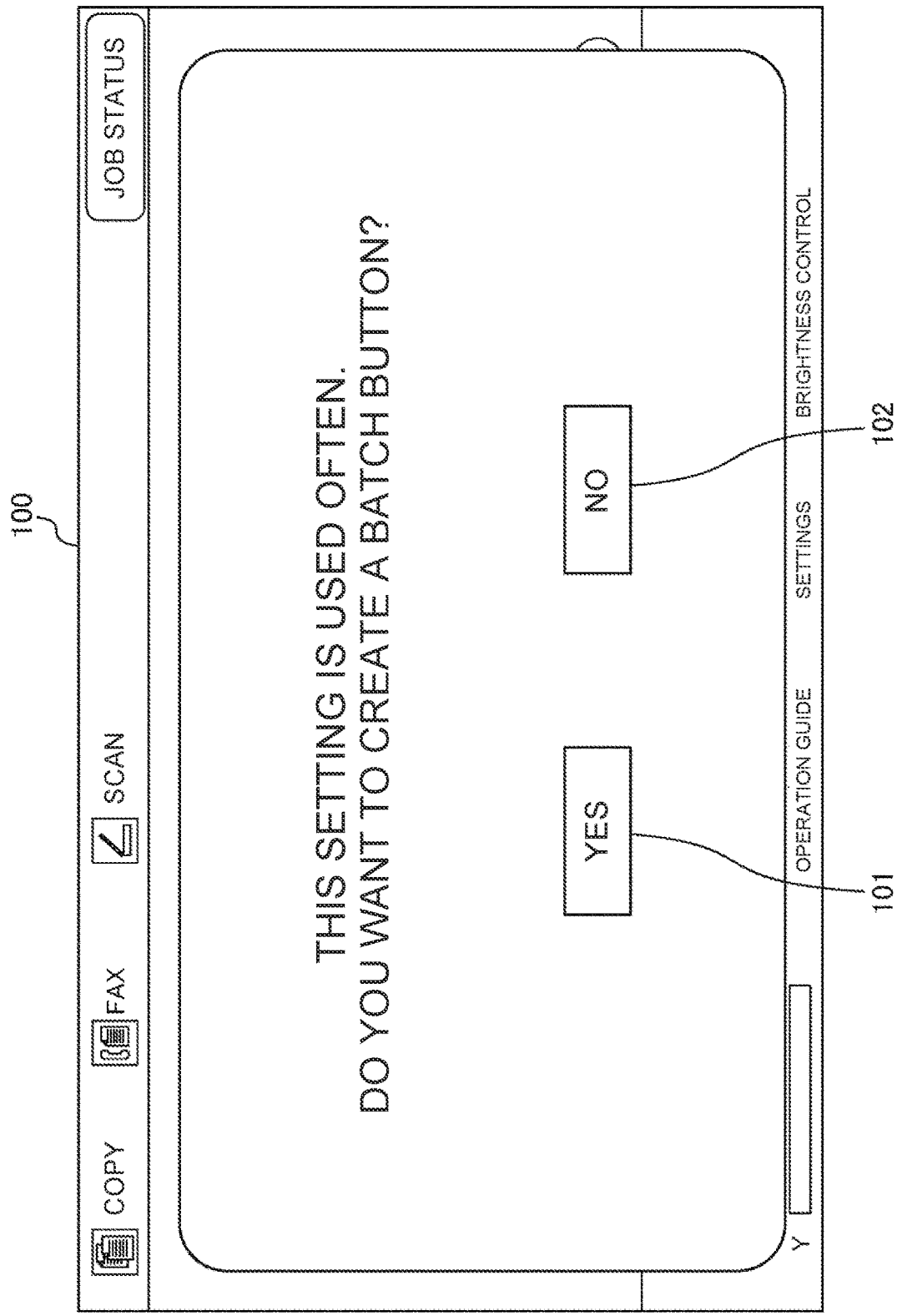
FIG. 3 is a diagram illustrating an example of a selection screen displayed on the display in FIG. 1.

FIG. 3 illustrates an example of a batch button creation selection screen 100 displayed by display 13. The batch button creation selection screen 100 is a screen containing selection buttons 101 and 102. The batch button creation selection screen 100 may display information indicating that the series of processing details executed by the image display device 10 under an instruction from a user has satisfied the execution condition. For example, as illustrated in FIG. 3, the batch button creation selection screen 100 may display a notification "This setting is used often". The batch button creation selection screen 100 may display specific functions and settings for the series of processing details that satisfies the execution condition. For example, the batch button creation selection screen 100 may display a notification "copy settings of A4 paper, from one side to both sides, 5 copies are used often". The batch button creation selection screen 100 may also display information inquiring whether or not to create a batch button. For example, as illustrated in FIG. 3, the batch button creation selection screen 100 may display a notification "Do you want to create a batch button?"

The batch button creation selection screen 100 contains selection buttons 101 and 102. The selection button 101 is a button for causing a batch button to be displayed, and here, consists of a "YES" button. The selection button 102 is a button selected to not display a batch button, and here, consists of a "NO" button. When a batch button is to be created, a user makes an operation input to select the selection button 101 indicating "YES". Meanwhile, when a batch button is not to be created, a user makes an operation input to select the selection button 102 indicating "NO".

When the selection button 101 is selected, i.e., the batch button is selected to be displayed, the controller 11 causes the display 13 to display a batch button. In the example illustrated in FIG. 3, the operation input to the button "YES" means selecting to display a batch button. Specifically, the controller 11 executes a process of displaying a batch button on the display 13 through steps S14 to S16.

That is, the controller 11 determines whether or not to display a batch button on the basis of the operation input from a user (step S14). For example, in the example of the batch button creation selection screen 100 illustrated in FIG. 3, if a user makes an operation input to select "YES", the controller 11 determines to display a batch button. Meanwhile, if a user makes an operation input to select "NO", the controller 11 determines to not display a batch button.

If the controller 11 determines not to display a batch button (No in step S14), the flow ends. In this case, the controller 11 may execute the flow again from the beginning when another operation input is received from a user.

Meanwhile, if the controller 11 determines to display a batch button (Yes in step S14), the controller 11 creates a batch button (step S15).

Figure 4:
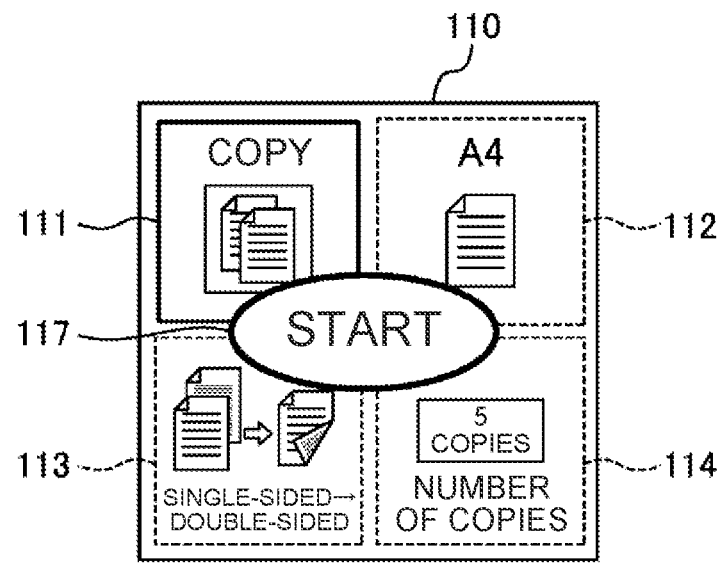
FIG. 4 is a diagram illustrating an example of a batch button.

Now, a batch button is described in detail. FIG. 4 illustrates an example of a batch button 110. As illustrated in FIG. 4, the batch button 110 has icons indicating a function and settings included in the series of processing details. If a series of the series of processing details includes multiple settings, the batch button 110 has icons indicating the respective settings. That is, the batch button 110 includes icons indicating as many settings as there are settings included in the series of processing details.

For example, in a description using the example above, it is assumed that a series of processing details includes the function "copy" and the settings "copy paper: A4", "copy from one side to both sides", and "five copies". In this case, one batch button 110 contains an icon indicating the function "copy" (a function icon 111 in FIG. 4) and icons indicating the settings "copy paper: A4", "copy from one side to both sides", and "five copies" (a first setting icon 112, a second setting icon 113, and a third Setting icon 114 in FIG. 4).

Each of the icons contained in the batch button 110 may be displayed on the display 13 in different modes: one indicating functions and settings that are changeable and the other indicating functions and settings that are unchangeable. Here, changeable or unchangeable means whether or not a user can change the settings when a batch button is used to execute processing. The specific processing when a user uses a batch button to execute processing is explained in detail with reference to FIG. 9.

Whether a setting is changeable or unchangeable may be predetermined for each function and setting. For example, a function may be defined as unchangeable. This is because changing a function fundamentally changes the processing executed by the image display device 10 and compromises the convenience of the batch button 110. For example, a setting may be defined as changeable. This is because it is more convenient for a user to be able to change detailed settings depending on the user's desires when a series of similar processing details is executed. Some of the settings may be defined as unchangeable. The classification of changeable or unchangeable described here is only an example and does not necessarily have to be classified as described here. For example, functions may be defined as changeable and settings may be defined as unchangeable. For the purposes of this specification, functions are assumed to be unchangeable and settings are assumed to be changeable. That is, in the example illustrated in FIG. 4, the function "copy" cannot be set, while the settings "copy paper: A4", "copy from one side to both sides" and "five copies" can be changed respectively.

Icons indicating functions and settings that are changeable and icons indicating functions and settings that are unchangeable can be displayed in different modes through various methods. For example, in the example illustrated in FIG. 4, the function icon 111, which indicates a function that is unchangeable, is surrounded by a solid line, while the first setting icon 112, the second setting icon 113, and the third setting icon 114, which indicate settings that are changeable, are surrounded by dashed lines.

The display mode can be varied through various method other than the type of line surrounding the icon, as described above. For example, whether the functions and settings are changeable or unchangeable can be indicated by any method such as the presence of a line around the icon, the color of the icon, or the size of the icon may indicate.

Figure 5:
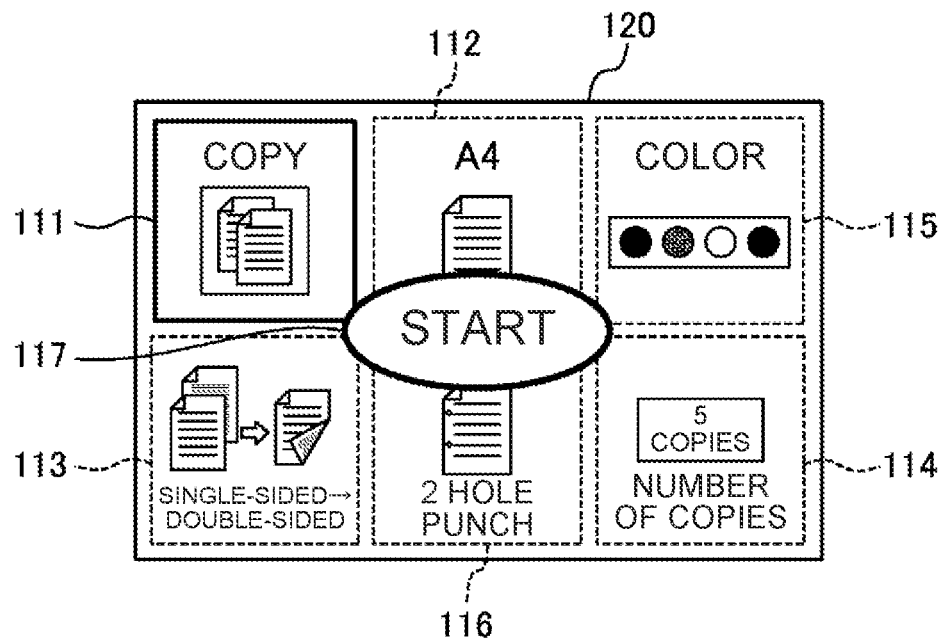
FIG. 5 is a diagram illustrating another example of a batch button.

The size of a batch button may vary depending on the number of icons included in the batch button. FIG. 5 illustrates another example of a batch button. Specifically, a batch button 120 illustrated in FIG. 5 includes one icon (the function icon 111) indicating one function and five icons indicating five settings. Specifically, the batch button 120 in FIG. 5 contains, in addition to the three icons, the first setting icon 112, the second setting icon 113, and the third setting icon 114, included in the batch button 110 in FIG. 4, a fourth setting icon 115 indicating a "color copy" setting and a fifth setting icon 116 indicating a "2-hole punch". If the batch button 120 contains a total of six icons, the icons are small and difficult to see when they are displayed in the same size as that in the batch button 110 in FIG. 4. Therefore, the display 13 may change the size of the batch button to match the number of icons. For example, the batch button 120 in FIG. 5 is larger than the batch button 110 in FIG. 4 because the batch button 120 in FIG. 5 has more icons. If the number of icons is smaller than that of the batch button 110 in FIG. 4, the batch button may be displayed in a smaller size than that of the batch button 110 in FIG. 4.

The size of a batch button does not necessarily need to be varied depending on the number of icons contained in the batch button. For example, for batch buttons of the same size, the size of the icons displayed may vary depending on the number of icons contained the batch buttons.

As illustrated in FIGS. 4 and 5, the batch buttons 110 and 120 may each contain an execution icon 117 to execute a series of processing details. The execution icon 117 may be centered on the batch buttons 110 and 120, as illustrated in FIGS. 4 and 5, respectively. However, the placement of the execution icon 117 is not limited to the center and may be placed at any position within the batch buttons 110 and 120. If the execution icon 117 overlaps with other icons (in this example, the function icon 111, the first setting icon 112, the second setting icon 113, the third setting icon 114, the fourth setting icon 115, and the fifth setting icon 116), description areas describing the details of the icons may be placed in any non-overlapping position while the sizes of the icons may be adjusted. To prevent the execution icon 117 from overlapping with the description areas containing the details of the functions or settings of the respective icons, the description areas containing the details of the functions or settings of the respective icons may be arranged on the peripheries of the respective icons around the execution icon 117. When the execution icon 117 is operated by a user, the controller 11 executes the series of processing details of a batch button including the execution icon 117. That is, the controller 11 executes the functions contained in the batch button with the settings contained in the batch button. When a batch button is described below in this specification, the batch button 110 is used, but the batch button 110 referred to below may be replaced by the batch button 120 or any other batch button.

In step S15, the controller 11 creates a batch button by, for example, confirming the function and the settings included in a series of processing details, confirming whether the function and the settings are changeable, and placing icons indicating the function and the settings in the batch button in a display mode corresponding to the confirmed result.

The controller 11 then causes the display 13 to display the batch button created in step S15 (step S16). For example, the controller 11 may display a batch button on a portal screen. The portal screen is a screen displayed on the display 13 to accept an input for a function that can be executed by the image display device 10.

Figure 6:
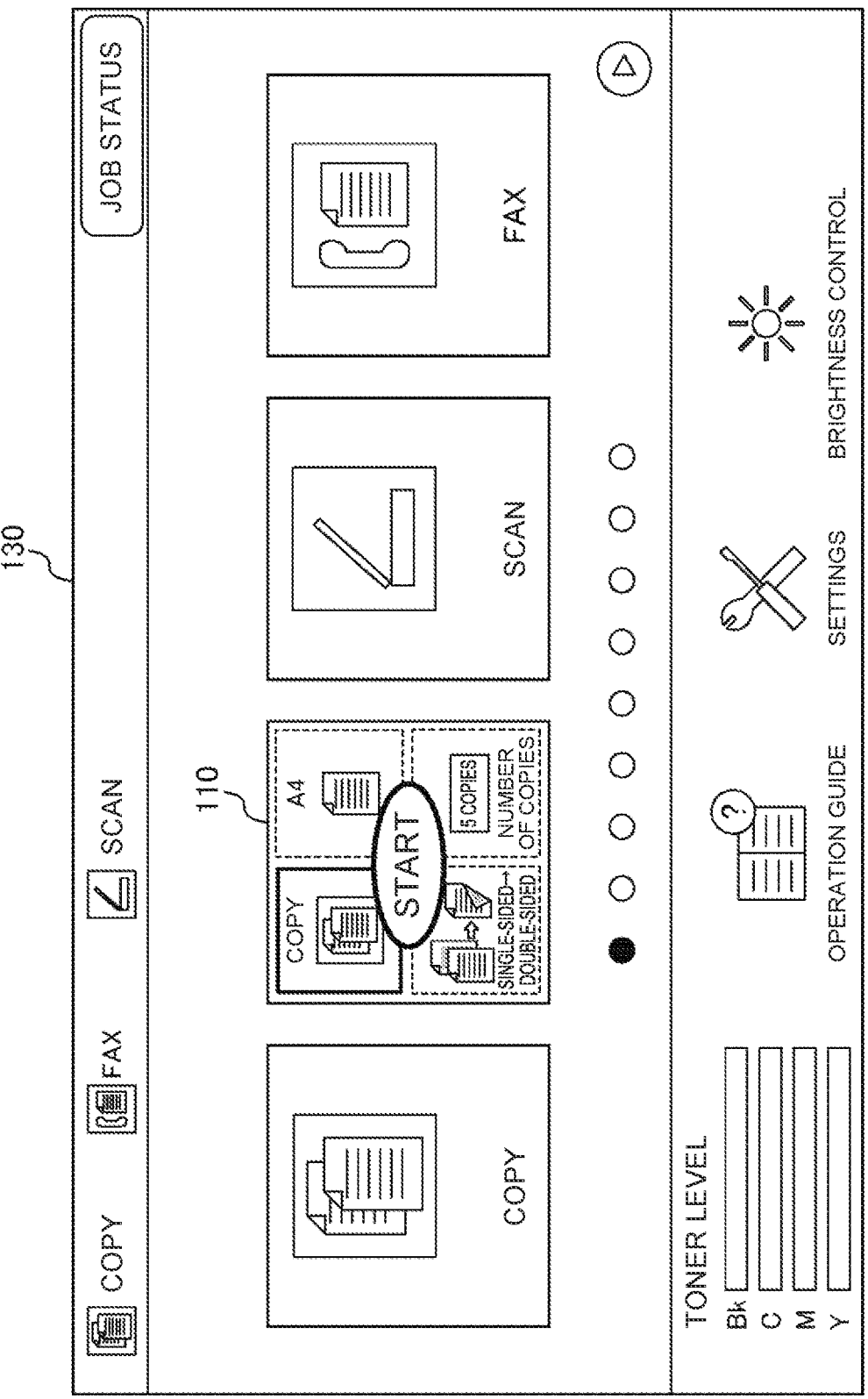
FIG. 6 is a diagram illustrating an example of a portal screen displayed on the display in FIG. 1.

FIG. 6 illustrates an example of a portal screen 130 displayed by the display 13. The portal screen 130 displays buttons for functions that can be executed by the image display device 10. In the example illustrated in FIG. 6, the portal screen 130 displays buttons for copy, scan, and fax as buttons for functions that can be executed by the image display device 10. To execute these functions, a user selects a button for the desired function from the buttons for the functions displayed on the portal screen 130 and makes an operation input to execute the corresponding function.

In step S16, the batch button 110 is displayed on the portal screen 130, as illustrated in FIG. 6. The batch button 110 is displayed on the portal screen 130 through the flow from steps S11 to S16 in FIG. 2. Therefore, the batch button 110 is not displayed on the initial portal screen 130 (i.e., the portal screen before the flow in FIG. 2 is executed).

In step S16, the batch button 110 may be placed in a predetermined position on the portal screen 130. In the example illustrated in FIG. 6, the batch button 110 is the second from the left of the four buttons in the left-right direction.

Next, the controller 11 determines whether or not to change the layout (step S17). The layout here refers to the position of the batch button 110 displayed on the display 13. The controller 11 may determine whether or not to change the layout on the basis of an operation input from a user.

For example, the controller 11 displays a layout change selection screen on the display 13. The layout change selection screen is a screen that allows a user to select whether or not to change the layout. For example, the controller 11 may automatically display the layout change selection screen after displaying the batch button 110 in step S16 or may display the layout change selection screen when a specified operation input by a user is detected.

Figure 7:
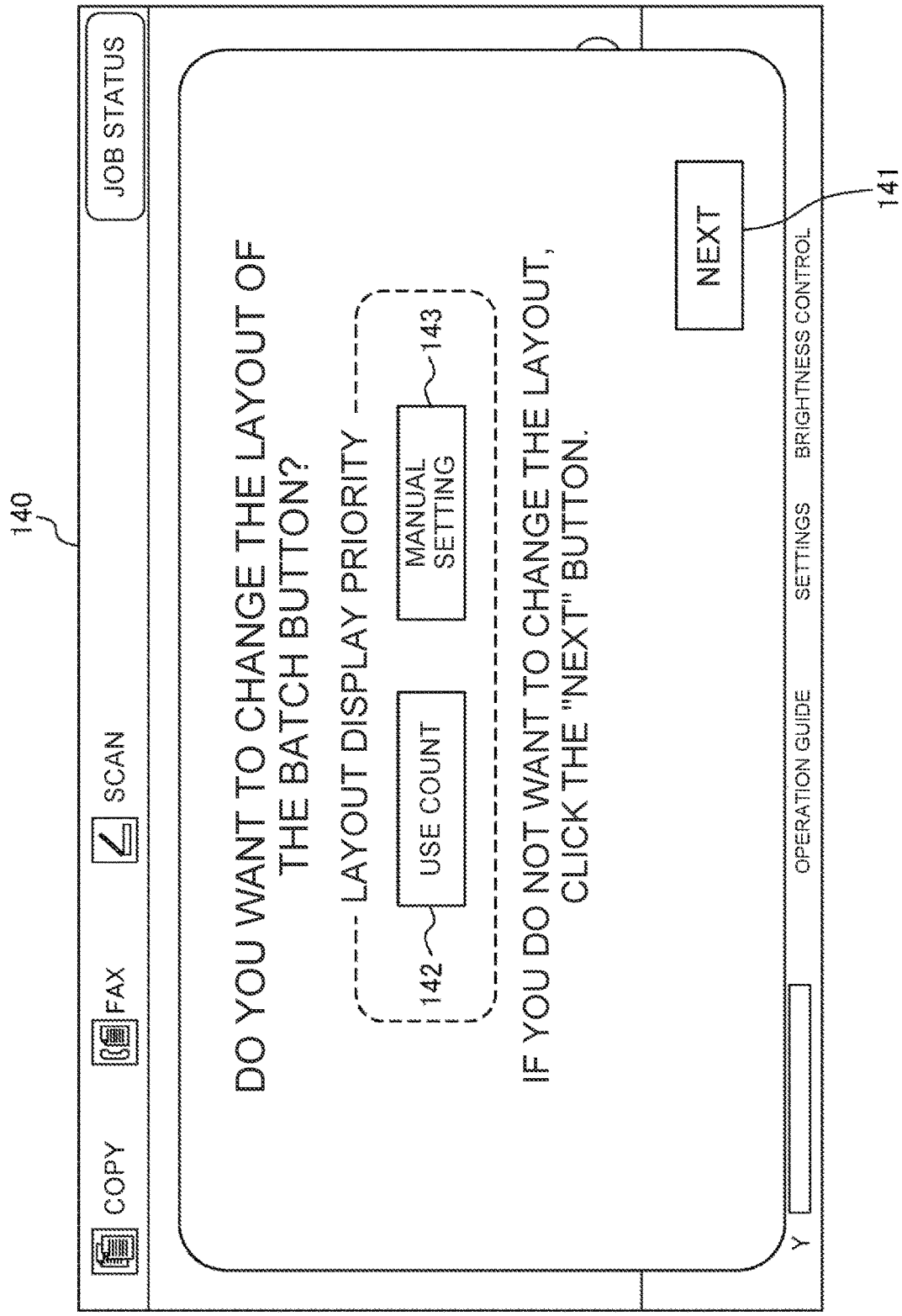
FIG. 7 is a diagram illustrating an example of a layout change selection screen displayed on the display in FIG. 1.

FIG. 7 is an example of a layout change selection screen 140 displayed by the display 13. The layout change selection screen 140 includes buttons for inputting whether or not the layout is to be changed. For example, in the example illustrated in FIG. 7, an enter button 141 labeled "NEXT" is displayed as a button for inputting that the layout is not to be changed. When the controller 11 detects an operation input of, for example, touching the enter button 141, the controller 11 may determine in step S17 that the layout is not to be changed.

In the example illustrated in FIG. 7, a layout change first button 142 labeled "Number of Uses", and a layout change second button 143 labeled "Manual Settings" are displayed as buttons for inputting a change in the layout. The layout change first button 142 and the layout change second button 143 are both buttons for changing the layout. When the controller 11 detects an operation input of, for example, touching the layout change first button 142 or the layout change second button 143, the controller 11 may determine in step S17 that the layout is to be changed. The two buttons, the layout change first button 142 and the layout change second button 143, change the layout in different ways.

Figure 8:
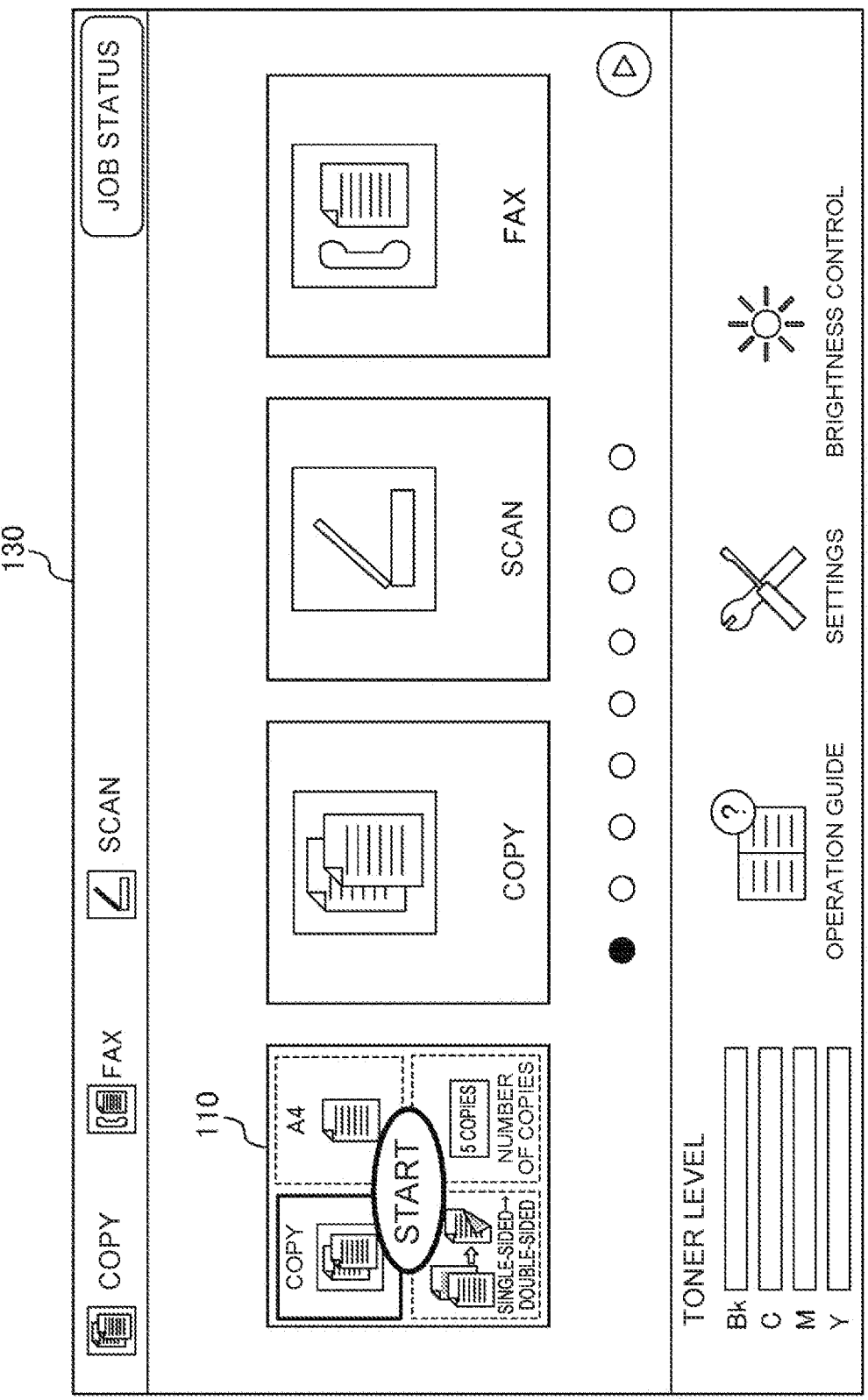
FIG. 8 is a diagram illustrating an example of a portal screen after layout change.

The layout change first button 142 is an input button for changing the layout on the basis of the number of uses. When a user makes an operational input of touching the layout change first button 142, the controller 11 changes the layout of the portal screen 130 on the basis of the number of uses of the functions indicated by the buttons displayed on the portal screen 130. For example, the controller 11 may refer to the history information stored in the storage 12 and change the layout so that the buttons indicating functions that have been used more frequently are placed in order from the left side. At this time, the controller 11 may preferentially place the created batch button 110 on the left side. That is, the controller 11 may place the batch button 110 on the leftmost side, as illustrated in FIG. 8. If multiple batch buttons are created, the controller may place the more frequently used batch button on the left side. The method of changing the layout described here is merely an example. Therefore, the controller 11 may change the layout on the basis of other criteria.

The layout change second button 143 is an input button to freely change the layout by an operation input by an input. When a user makes an operational input of touching the layout change first button 142, the controller 11 enters a state in which the layout of the buttons displayed on the portal screen 130 is changeable. In this state, a user can change the arrangement of the buttons as desired. For example, a user can change the arrangement of the buttons by a drag-and-drop operation. In this way, a user can change the placement of the batch button 110, for example, from that in the layout illustrated in FIG. 6 to that in the layout illustrated in FIG. 8.

If it is determined that the layout is not to be changed (No in step S17), the controller 11 ends the flow. In this case, since the batch button 110 is created, the batch button 110 is displayed on the portal screen 130, for example, as in FIG. 6. In this case, the controller 11 may execute the flow again from the beginning when another operation input is accepted from a user.

Meanwhile, if it is determined that the layout is to be changed (Yes in step S17), the controller 11 changes the layout of the portal screen 130 on the basis of an operation input by a user (step S18). In this case, the controller 11 changes the layout through a predetermined method on the basis of an operation input from a user. For example, in the example described with reference to FIG. 7, the layout is changed through the method described above depending on which button received an operation input by a user: the layout change first button 142 or layout change second button 143.

If the controller 11 changes the layout in step S18, the flow ends. In this case, since the batch button 110 is created and the layout is changed, the batch button 110 is displayed on the portal screen 130, for example, as in FIG. 8. The controller 11 may execute the flow again from the beginning when another operation input is received from a user. In this way, the batch button creation process is executed.

As described with reference to FIG. 2, when the batch button 110 is created through the batch button creation process, the batch button 110 is displayed on the portal screen 130. Through an operation input of touching to the batch button 110, a user can cause the image display device 10 to execute a series of processing details. The details of the processing executed by the controller 11 when a user makes an operation input of touching the batch button 110 are described with reference to FIG. 9. The processing executed by the controller 11 when a user makes an operation input of touching the batch button 110 is also referred to as "batch button execution process".

Figure 9:
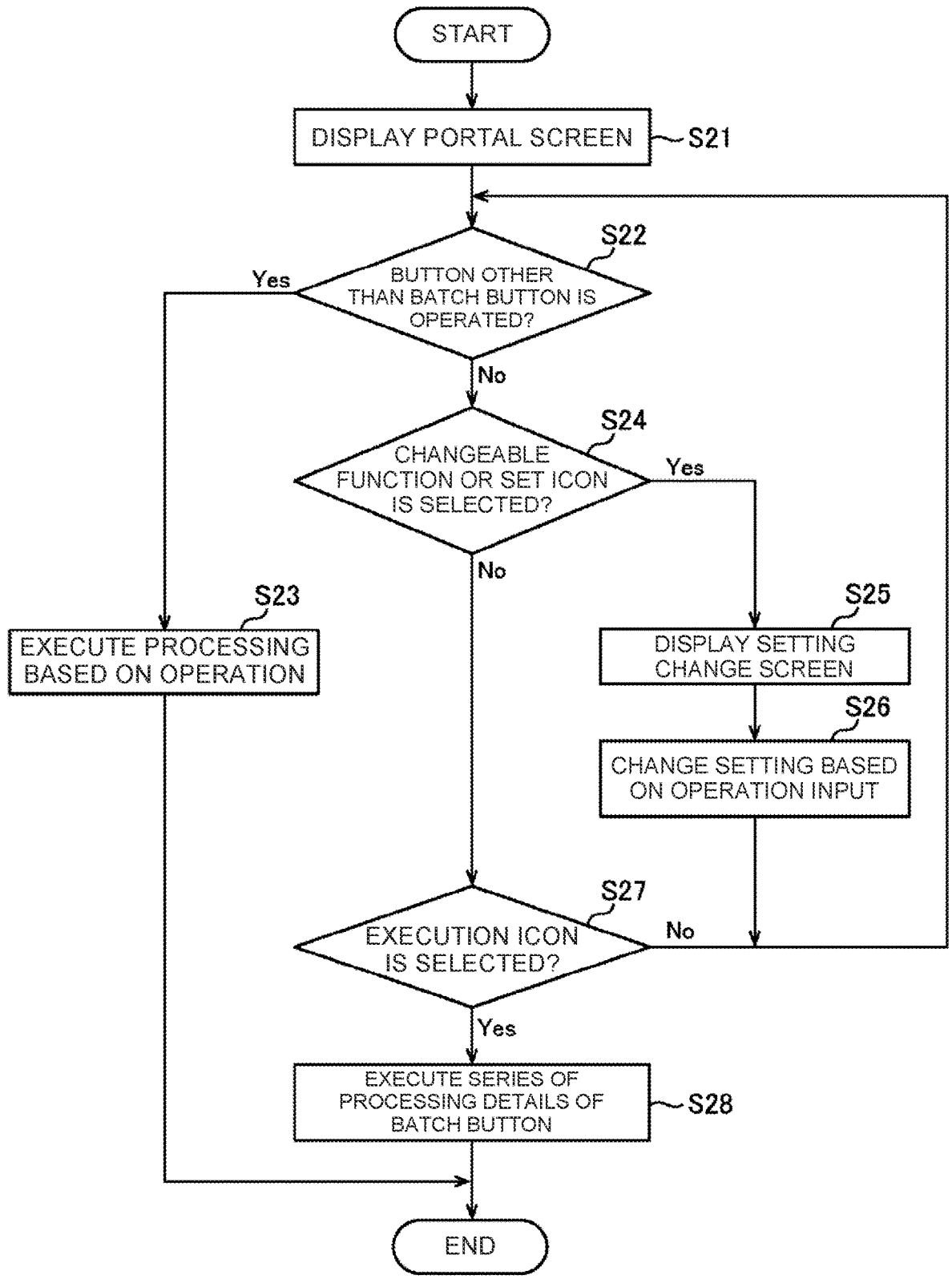
FIG. 9 is a flowchart illustrating an example of a batch button execution process executed by the controller in FIG. 1.

FIG. 9 is a flowchart illustrating an example of a batch button execution process executed by the controller 11. The flow in FIG. 9 may be initiated, for example, after a batch button has been created by the flow in FIG. 2.

First, the controller 11 causes the display 13 to display the portal screen 130 (step S21). For example, the controller 11 may cause the display 13 to display the portal screen 130 illustrated in FIG. 6 or 8. The controller 11 then executes processing on the basis of an operational input by a user made to each button contained in the portal screen 130.

For example, the controller 11 determines whether or not an operation input is made to any of the buttons displayed on the portal screen 130 other than the batch button 110 (step S22). Buttons other than the batch button 110 include buttons for performing copying, faxing, and scanning in the examples illustrated in FIGS. 6 and 8.

If it is determined that an operation input is made to a button other than the batch button 110 (Yes in step S22), the controller 11 executes processing based on the operation input (step S23). For example, when an operation input such as a touching operation is made to a button for executing the copy function, the controller 11 executes the copy function on the basis of an operation input by a user. This is also the same for faxing and scanning or other functions.

Meanwhile, if it is determined that no operation input has been made to buttons other than the batch button 110 (No in step S22), the controller 11 determines whether or not an icon for a changeable function or setting in the batch button 110 is selected (step S24). For example, in the case of the batch button 110 illustrated in FIG. 4, the controller 11 determines whether or not one of the first setting icon 112, the second setting icon 113, and the third setting icon 114, which indicate changeable settings, has been selected. For example, the controller 11 determines that the touched icon is selected when a touch operation input is made to any of the first setting icon 112, the second setting icon 113, and the third setting icon 114.

When the controller 11 accepts an input to select an icon indicating a function or setting that is changeable, the controller 11 changes the function or setting indicated by the selected icon on the basis of the accepted input. In the flow illustrated in FIG. 9, the controller 11 can change a function or setting through steps S25 and S26.

In the example flow illustrated in FIG. 9, if the controller 11 determines that the icon of a changeable function or setting has been selected (Yes in step S24), a setting change screen is displayed on the display 13 (step S25). The setting change screen is the screen on which a user enters an operation input to change a setting. If a function is changeable, a function change screen for changing the function may be displayed in place of the setting change screen.

Figure 10:
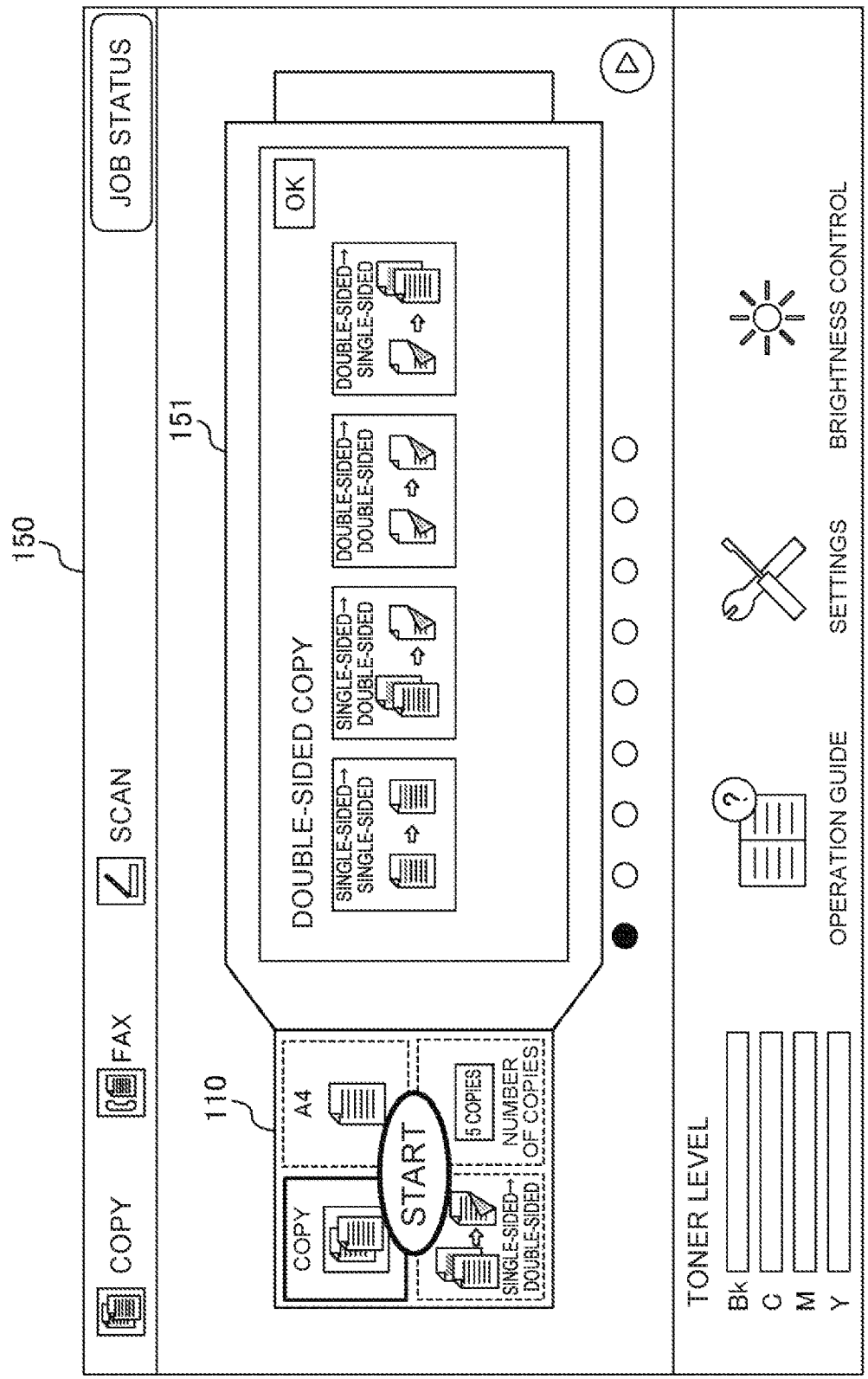
FIG. 10 is a diagram illustrating an example of a setting change screen displayed on the display.

FIG. 10 is a diagram illustrating an example of a setting change screen 150. Specifically, FIG. 10 is an example of a screen displayed on the display 13 when the second setting icon 113 indicating a setting "copy from one side to both sides" is selected. When the second setting icon 113 is selected, the setting change screen 150 displays setting candidates selectable in the setting indicated by the selected icon (second setting icon 113). The selectable setting candidates are indicated in, for example, a pop-up 151 in FIG. 10. However, the method of displaying selectable setting candidates is not limited to the pop-up 151 and may be any other method. For example, selectable setting candidates may be displayed by switching the display screen in the display 13.

In the example illustrated in FIG. 10, "copy from one side to one side", "copy from one side to both sides", "copy from both sides to both sides", and "double-sided to single-sided copy" are displayed as setting candidates that can be selected. A user makes an operational input to select a desired setting from the selectable setting candidates displayed on the setting change screen 150.

When the controller 11 accepts an operation input to select a setting, the controller 11 changes the setting on the basis of the operation input (step S26). That is, the controller 11 changes the setting to the one selected by a user through the operation input. In this case, in the batch button 110 displayed on the display 13, the icon whose setting content relates to the setting that has been changed may be changed to indicate the changed content. The controller 11 then cause the flow to proceeds to step S22.

A user can change multiple types of settings. For example, as illustrated in FIG. 4, if the batch button 110 has three different changeable settings, a user can change between a maximum of three different settings. If there is no need to change a setting, a user does not need to select an icon to change the setting.

If it is determined in step S24 that an icon for a changeable function or setting is not selected (No in step S24), the controller 11 determines whether or not the execution icon 117 is selected (step S27). For example, the controller 11 determines that the execution icon 117 is selected when an operation input of touching the execution icon of the batch button 110 is detected.

If the controller 11 determines that the execution icon 117 is not selected (No in step S27), the process proceeds to step S22.

Meanwhile, if it is determined that the execution icon 117 is selected (Yes in step S27), the controller 11 executes the series of processing details indicated by the batch button 110 (step S28). That is, the controller 11 executes the function indicated by the icon related to the function contained in the batch buttons 110 at the settings indicated by the icons related to the settings contained in the batch buttons 110. At this time, if the contents of the changeable settings are changed in steps S25 and S26, the series of processing details is executed with the changed details.

For convenience, each step in the flow in FIG. 9 is described in chronological order, but the steps in the flow in FIG. 9 do not necessarily have to be executed in the order illustrated in FIG. 9. For example, steps S22, S24, and S27 may be executed simultaneously, and a process corresponding to an operation input from a user may be executed.

As explained with reference to FIG. 2, when the series of processing details executed on the basis of an operation input of a user satisfies an execution condition, the image display device 10 can cause the display 13 to display the batch button 110 summarizing the series of processing details. Thus, since the image display device 10 automatically creates a batch button 110 for a frequently used series of processing details, there is no need for a user to specify the content of the batch button 110 to the image display device 10 or operate the image display device 10 to create the batch button 110. Thus, the image display device 10 can create and display the batch button 110 without an active operation by a user, thus improving user convenience.

When a user makes an operation input to select the batch button 110 displayed on the display 13, the image display device 10 executes a series of processing details indicated by the batch button 110. Therefore, after the batch button 110 is displayed, a user can cause a frequently used series of processing details to be executed without entering detailed settings through operation inputs. Therefore, the convenience of the image display device 10 can be improved.

In the present embodiment, for example, as in step S14, the controller 11 asks a user whether or not to display a batch button when a series of processing details satisfies an execution condition. In this way, the image display device 10 can prompt a user to create a batch button when a series of processing details satisfies an execution condition. This allows a user to recognize that the same series of processing details is frequently executed, so the image display device 10 can provide the user an opportunity to create the batch button 110. The image display device 10 allows the user to decide whether or not to actually display a batch button 110 by asking a user whether or not to display the batch button. Therefore, a user can choose not to display an unnecessary batch button 110.

Furthermore, in the present embodiment, as in steps S25 and S26, a user can change changeable settings when the batch button 110 is to be selected. Therefore, if the user wishes to change only a portion of the series of processing details, the user can specify a desired setting while using the batch button 110 and have the image display device 10 execute the process. In this way, the image display device 10 can be modified in detail in accordance with a user's desire, thus improving convenience.

In the flow described in the above embodiments, some of the steps may not necessarily be executed. For example, steps S13 and S14 do not necessarily have to be executed. That is, a user does not necessarily have to select whether or not to create the batch button 110 by displaying the selection buttons 101 and 102. For example, the layout change described in steps S17 and S18 does not necessarily have to be performed.

In the above embodiments, the batch button 110 is displayed when the series of processing details satisfies an execution condition. However, the batch button 110 may be displayed, for example, by a user making a predetermined operation input to the image display device 10 even when the series of processing details satisfies an execution condition. That is, when a user makes an operation input to display the batch button 110, the controller 11 may create the batch button 110 and display it on the display 13 on the basis of the operation input.

Although the disclosure has been described on the basis of the drawings and embodiments, it should be noted that a person having ordinary skill in the art can easily make various variations and modifications based on the disclosure. Accordingly, it should be noted that these variations and modifications are included within the scope of the disclosure. For example, the functions included in the respective functional parts or steps can be rearranged in a logically consistent manner, and multiple functional parts or steps can be combined into one or divided.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image display device comprising:
a display that displays an executable function;
an acceptor that accepts an input of a function to be executed and a setting selectable for the function;
a storage that stores history information, the history information being a series of processing details associating the function to be executed based on the input with the setting used when the function is executed; and
a controller that causes the display to display a batch button summarizing the series of processing details when the series of processing details satisfies a predetermined execution condition,
wherein the controller further causes the display to display a selection button allowing a selection of whether to display the batch button when the series of processing details satisfies the predetermined execution condition, and causes the batch button to be displayed on the display when the selection button is operated to select the display of the batch button.

2. The image display device according to claim 1, wherein the predetermined execution condition is processing of the series of processing details being executed a predetermined number of times or more or a percentage of execution of processing of the series of processing details being a predetermined value or more.

3. The image display device according to claim 1, wherein the batch button includes icons each indicating a function and a setting included in the series of processing details.

4. An image display device comprising:
a display that displays an executable function;
an acceptor that accepts an input of a function to be executed and a setting selectable for the function;
a storage that stores history information, the history information being a series of processing details associating the function to be executed based on the input with the setting used when the function is executed; and
a controller that causes the display to display a batch button summarizing the series of processing details when the series of processing details satisfies a predetermined execution condition,
wherein the batch button includes icons each indicating a function and a setting included in the series of processing details, and
the controller further causes the display to display, among the icons, any icon indicating a changeable function and a changeable setting and any icon indicating an unchangeable function and an unchangeable setting in different modes from each other.

5. The image display device according to claim 4, wherein when the acceptor accepts a selection input of the icon indicating the changeable function or the changeable setting, the controller changes the changeable function or the changeable setting indicated by the selected icon based on the accepted input.

6. An image display device comprising:
a display that displays an executable function;
an acceptor that accepts an input of a function to be executed and a setting selectable for the function;
a storage that stores history information, the history information being a series of processing details associating the function to be executed based on the input with the setting used when the function is executed; and
a controller that causes the display to display a batch button summarizing the series of processing details when the series of processing details satisfies a predetermined execution condition,
wherein the batch button includes icons each indicating a function and a setting included in the series of processing details, and
a size of the batch button displayed on the display differs depending on a number of the icons.

7. The image display device according to claim 1, wherein the batch button includes an execution icon that causes the series of processing details to be executed.

\* \* \* \* \*